Patented June 7, 1949

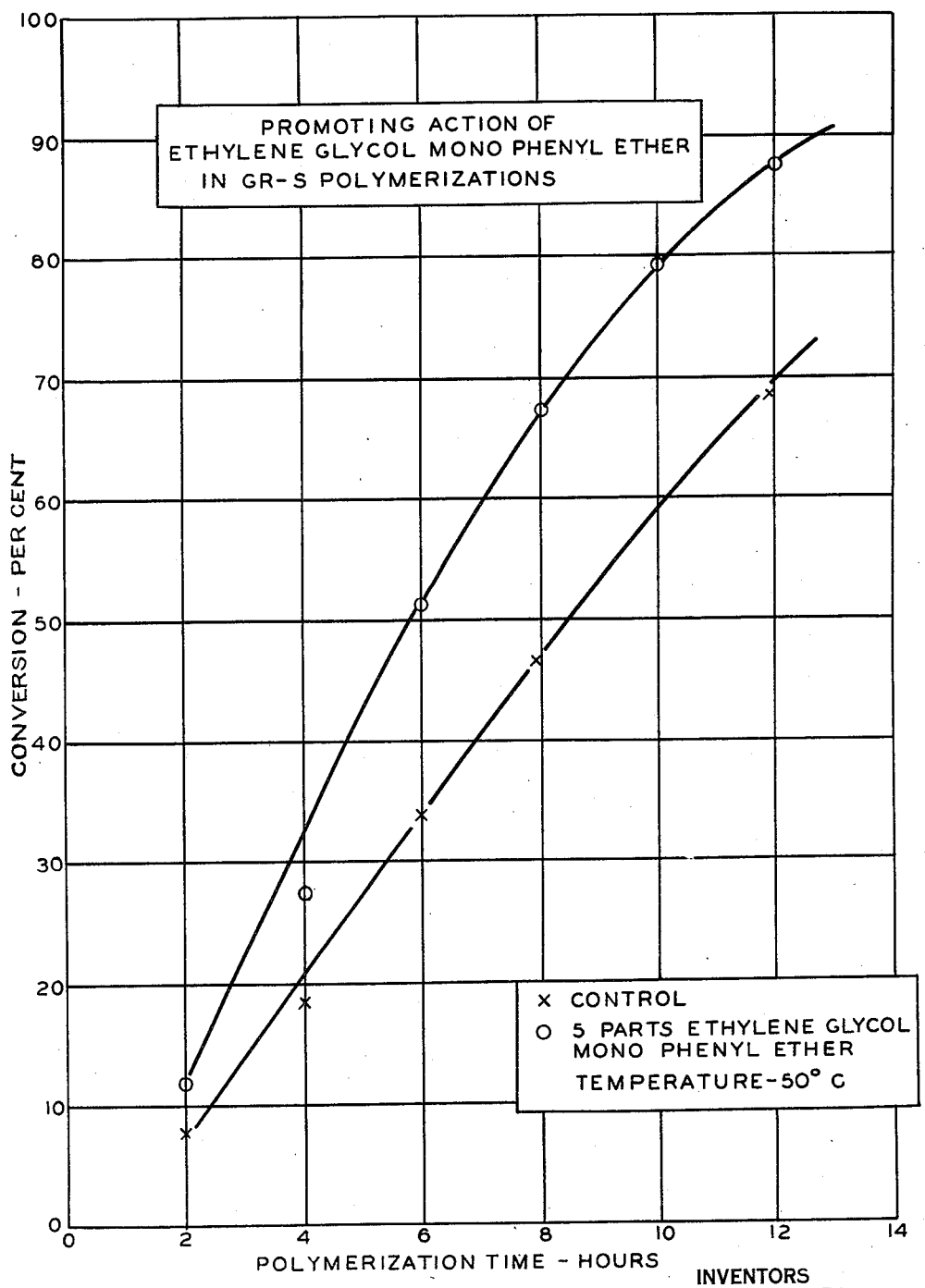

2,472,232

UNITED STATES PATENT OFFICE 2,472,232

BUTADIENE EMULSION POLYMERIZATION IN THE PRESENCE OF A GLYCOL MONO-ETHER

Walter A. Schulze and Willie W. Crouch, Bartlesville, Okla., assignors to Phillips Petroleum Company, a corporation of Delaware Application December 26, 1944, Serial No. 569,902

11 Claims. (Cl. 260—86.5)

This invention relates to a process for the polymerization of polymerizable organic compounds. In one of its specific embodiments, this invention relates to a process for the polymerization of butadiene in an aqueous emulsion in which a substance capable of copolymerization with butadiene may also be employed. One important aspect of this invention is the method of increasing the rate of polymerization, which is applicable to conventional emulsion polymerization systems.

In present-day processes for the manufacture of synthetic rubber wherein the monomeric raw material is emulsified in aqueous soap solutions to provide a reaction medium for the production of a synthetic latex, primary consideration must be given to the quality of the resultant polymer, especially as regards tack, cohesiveness and milling characteristics. Thus, in the widely-used process for the manufacture of Buna S polymers, extensive experience has established that a reaction period of about 15 hours at about 50° C. resulting in a conversion of monomers of 75–80 per cent is necessary in order to produce the highest quality polymers compatible with economically feasible reaction times. The above conditions represent a compromise between product quality and economics. Thus, it is obvious that with a polymerization period of 15 hours, equipment investment costs are necessarily high in order to achieve large scale production. An obvious expedient to reduce the reaction time would involve an increase in reaction temperature; however, it is well known that the quality of the product is rapidly degraded with increasing temperatures. It is also well known that as the reaction temperature is decreased the quality of the polymeric product improves. If the reaction temperature is adjusted to give a polymer of optimum characteristics, the rate of polymerization is reduced to such an extent that the process becomes economically inoperable. It is immediately apparent that a means for increasing polymerization rates at the present or even lower temperature levels would be an advantageous contribution to the art of emulsion polymerization.

An object of this invention is to provide an improved process for the polymerization of polymerizable organic compounds.

Another object of this invention is to provide a process which is particularly useful for the production of Buna type polymers.

Another object is to provide such a process applicable to the polymerization of butadiene with suitable comonomers wherein a reduction in polymerization time is realized without impairment of product quality.

A further object of this invention is to provide such a process employing additive agents capable of exerting a promoting action on the rate of emulsion polymerization reactions and forming a part of this invention.

Other objects and advantages of this invention will be apparent from the following detailed disclosure.

We have now found that the rate of reaction in emulsion polymerization systems can be materially increased by addition to the polymerization recipe of relatively minor quantities of selected mono-ethers of ethylene glycol. Compounds of this type are particularly effective in polymerization systems involving conjugated diolefins in admixture with other polymerizable organic compounds such as the butadiene-styrene system employed in the manufacture of Buna S polymers. Regardless of the particular polymerization system involved, the manner of accomplishing the increased reaction rate is substantially the same. The selected ethylene glycol mono-ether is emulsified in a soap solution along with the usual ingredients comprising the monomeric material, the polymerization catalyst and modifiers. The reaction is carried out in the usual manner to give the desired extent of polymerization of the monomer charge. The glycol mono-ether along with unreacted monomers may be removed from the latex by steam distillation and recycled as a solution to another reactor charge. The polymeric product is recovered and processed by conventional procedures.

The preferred promoting agents of our invention comprise the alkyl and aryl mono-ethers of ethylene glycol. Specific promoters selected from this group include: ethyl, propyl, isopropyl, butyl, isobutyl, sec-butyl, tert-butyl, amyl, phenyl and tolyl mono-ethers of ethylene glycol. These activating agents are usually employed in quantities ranging from 1 to 10 parts by weight based on the weight of monomers in the recipe although higher quantities may in some instances be useful. The increase in reaction rate realized from the use of our novel agents is dependent on the reaction system, the specific promoter or mixture of promoters, and the quantity of promoter involved. Using about 5 parts of any of the commonly available glycol mono-ethers per 100 parts of Buna S monomers, reaction rates may be increased by as much as 25 to 50 per cent or higher.

The mechanism involved in the activation of emulsion polymerization systems by these promoting agents is obscure. However, it is obvious that there is no analogy between the action of the glycol mono-ethers of this invention and the conventional inorganic activators such as potassium ferricyanide. Thus, whereas ferricyanide activators are effective in small concentrations and over limited concentration ranges close to 0.15 part per 100 parts of monomer, the present organic agents must be present in concentration of at least 1 part per 100 parts of monomer and the activating effect increases with increasing proportions up to about 10 parts per 100 parts of monomer. Since our promoters are well known solvents it might be suspected that their action could be attributed to increased solubility of the reactants in the aqueous phase. If this were the case any organic solvent having measurable water and hydrocarbon solubility could be expected to have a promoting effect. We have found that a great many compounds having solubilizing characteristics exhibit no appreciable accelerating effect on reaction rates. Specific examples of such inoperative solvents include: acetone, ethylene glycol, isopropyl alcohol, lauryl alcohol as well as various esters and amines. Whatever the theory may be with respect to our highly specific groups of promoters, it is known that these compounds do not participate in the polymerization per se to any measurable extent. Substantially complete recovery of the promoters is realized at the conclusion of the reaction thus limiting the actual consumption of promoter to mechanical handling losses.

Our glycol mono-ethers are particularly effective as reaction rate accelerators in emulsion polymerization systems employing conjugated diolefins such as butadiene, isoprene, piperylene and the like, either alone or in admixture with each other or with other polymerizable organic compounds such as styrene, dichlorostyrene, vinylpyridine, acrylonitrile and the like. Of especial practical value is the beneficial effect of our promoting agents when used in butadiene-styrene emulsion systems such as those used in the preparation of GR–S synthetic rubber. The accompanying figure shows the effect of a specific promoter, ethylene glycol mono-phenyl ether, on the rate of polymerization of a standard GR-S recipe. The accompanying figure shows the relationship between the reaction time and the percentage of monomers converted to polymer. The standard recipe for GR-S is as follows:

| Component: | Parts by weight |
|---|---|
| Butadiene | 75 |
| Styrene | 25 |
| Modifier ($C_{12}$ mercaptan) | 0.4 |
| Initiator ($K_2S_2O_8$) | 0.3 |
| Soap | 5 |
| Water | 180 |

The reaction temperature is 50° C.

The following examples are offered as further illustration of the nature of this invention; however, no undue limitations are to be implied except as hereinafter imposed by the claims. The parts are by weight.

Example I

Ethylene glycol mono-phenyl ether to the extent of 5 parts is added to a typical polymerization recipe of the following composition:

| | Parts |
|---|---|
| Butadiene | 75 |
| Styrene | 25 |
| Tert–$C_{12}$ mercaptan | 0.28 |
| Potassium persulfate | 0.30 |
| Soap | 5.0 |
| Water | 180.0 |

The ingredients are emulsified and polymerization is allowed to proceed for 8 hours at 50° C. with constant agitation. The resulting latex is inhibited with 2.5 parts of phenyl-beta-naphthylamine and then coagulated with aluminum sulfate solution. The polymer is recovered and dried until substantially free of water. The yield of dry polymer is 67.4 parts.

Comparable polymerization runs carried out under identical conditions, employing the above recipe without the ethylene glycol mono-phenyl ether results in yields of dry polymer equivalent to 46.5 parts. The effect of the added ethylene glycol mono-phenyl ether is manifested in a 45 per cent increase in the rate of polymerization.

Example II

Ethylene glycol mono-butyl ether, 3 parts, is added to the polymerization recipe of Example I and polymerization is permitted to proceed for 6 hours at 50° C. The yield of dry polymeric product amounted to 35.2 parts. Without the presence of ethylene glycol mono-butyl ether, the typical recipe under identical reaction conditions yields 26.6 parts of polymer. An increase in polymerization rate of 32 per cent is realized over this relatively short reaction period resulting from the beneficial effect of the additive.

Example III

Ethylene glycol mono-ethyl ether, 5 parts, is added to the polymerization recipe of Example I and polymerization is allowed to proceed for 6 hours at 50° C. The yield of water-free polymeric product amounts to 30.2 parts. Under identical reaction conditions and in the absence of ethylene glycol mono-ethyl ether, the standard recipe yields 24.1 parts of polymer. An increase in the rate of reaction of 25 per cent over the initial 6 hours of polymerization must be attributed to the action of the added glycol mono-ether.

Example IV

The effectiveness of ethylene glycol monophenyl ether in recipes containing a different type of modifier is demonstrated by the present experimental run. To the following recipe

| | Parts |
|---|---|
| Butadiene | 75 |
| Styrene | 25 |
| Potassium persulfate | 0.30 |
| n-Dodecyl mercaptan | 0.40 |
| Soap | 5.0 |
| Water | 180.0 | there is added 3 parts of ethylene glycol monophenyl ether. After emulsification the polymerization is allowed to proceed for 6 hours at 50° C. The product is collected and dried as in Example I to give a yield of 49.6 parts. The same recipe in the absence of the glycol ether and under identical reaction conditions resulted in 38.9 parts of polymeric product. The increase in polymerization rate in recipes modified with primary-n-dodecyl mercaptan is, therefore, 27.5 per cent.

*Example V*

Ethylene glycol mono-phenyl ether, 5 parts, was added to the recipe of Example I. The ingredients were emulsified and polymerization was carried out at 50° C. with constant agitation for a period of 12 hours. A control run without promoter was carried out concurrently under otherwise identical conditions. The promoted recipe resulted in 87 per cent conversion of monomers to polymeric product as compared with a 69 per cent conversion in the case of the unpromoted recipe.

We claim:

1. In a process for the polymerization of aliphatic conjugated diolefins in an aqueous dispersion containing an emulsifying agent, the improvement which comprises carrying out the polymerization reaction in the presence of a minor proportion of a glycol mono-ether as a polymerization promoter.

2. In a process for the production of synthetic rubber, the improvement which comprises carrying out emulsion polymerization of monomeric material comprising an aliphatic conjugated diolefin in the presence of a minor proportion of a glycol mono-ether selected from the group consisting of ethyl, propyl, isopropyl, butyl, isobutyl, sec-butyl, tert-butyl, amyl, phenyl, and totyl mono-ethers of ethylene glycol.

3. In a process for the production of synthetic rubber, the improvement which comprises carrying out emulsion polymerization of monomeric material comprising 1,3-butadiene in the presence of a glycol mono-ether selected from the group consisting of ethyl, propyl, isopropyl, butyl, isobutyl, sec-butyl, tert-butyl, amyl, phenyl, and tolyl mono-ethers of ethylene glycol.

4. In a process for the production of synthetic rubber, the improvement which comprises emulsion polymerization of a mixture of 1,3-butadiene and styrene in the presence of a glycol monoether selected from the group consisting of ethyl, propyl, isopropyl, butyl, isobutyl, sec-butyl, tert-butyl, amyl, phenyl, and tolyl mono-ethers of ethylene glycol.

5. In a process for the production of synthetic rubber, the improvement which comprises emulsion polymerization of a mixture of 1,3-butadiene and styrene in the presence of ethylene glycol mono-ethyl ether.

6. In a process for the production of synthetic rubber, the improvement which comprises emulsion polymerization of a mixture of 1,3-butadiene and styrene in the presence of ethylene glycol mono-butyl ether.

7. In a process for the production of synthetic rubber, the improvement which comprises emulsion polymerization of a mixture of 1,3-butadiene and styrene in the presence of ethylene glycol mono-phenyl ether.

8. In a process for the polymerization of an aliphatic conjugated diolefin in an aqueous dispersion, the improvement which comprises carrying out the polymerization reaction in the presence of a glycol mono-ether in an amount between about 1 and about 10 parts per 100 parts of polymerization reactants.

9. In a process for the production of synthetic rubber by polymerizing a monomeric material comprising a conjugated aliphatic diolefin in an aqueous dispersion, the improvement which comprises conducting said polymerization in the presence of an ethylene glycol mono-ether in an amount between about 1 and about 10 parts per 100 parts by weight of monomeric material.

10. In a process for the emulsion copolymerization of butadiene and styrene to produce a synthetic rubber, the improvement which comprises conducting said polymerization in the presence of a glycol mono-ether in an amount between about 1 and about 10 parts per 100 parts of said butadiene and styrene.

11. In a process for the emulsion copolymerization of butadiene and styrene to produce a synthetic rubber, the improvement which comprises conducting said polymerization in the presence of ethylene glycol mono-phenyl ether in an amount between about 1 and about 10 parts per 100 parts of said butadiene and styrene.

WALTER A. SCHULZE.
WILLIE W. CROUCH.

REFERENCES CITED

The following references are of record in the file of this patent:

UNITED STATES PATENTS

| Number | Name | Date |
|---|---|---|
| 2,141,443 | Stanley | Dec. 27, 1938 |
| 2,222,967 | Wollthan | Nov. 26, 1940 |
| 2,276,597 | Stanley | Mar. 17, 1942 |
| 2,300,056 | Meis | Oct. 27, 1942 |